US011505700B2

(12) United States Patent
Ishibashi et al.

(10) Patent No.: US 11,505,700 B2
(45) Date of Patent: Nov. 22, 2022

(54) POLYOL COMPOSITION FOR MOLDING FLEXIBLE POLYURETHANE FOAM, AND FLEXIBLE POLYURETHANE FOAM

(71) Applicant: TOSOH CORPORATION, Shunan (JP)

(72) Inventors: Keita Ishibashi, Yokohama (JP); Naoya Yoshii, Yokohama (JP)

(73) Assignee: TOSOH CORPORATION, Yamaguchi (JP)

(*) Notice: Subject to any disclaimer, the term of this patent is extended or adjusted under 35 U.S.C. 154(b) by 334 days.

(21) Appl. No.: 16/323,245

(22) PCT Filed: Aug. 1, 2017

(86) PCT No.: PCT/JP2017/027815
§ 371 (c)(1),
(2) Date: Feb. 4, 2019

(87) PCT Pub. No.: WO2018/025836
PCT Pub. Date: Feb. 8, 2018

(65) Prior Publication Data
US 2019/0185667 A1    Jun. 20, 2019

(30) Foreign Application Priority Data

Aug. 5, 2016  (JP) ............................. JP2016-154423
Oct. 25, 2016 (JP) ............................. JP2016-208836
Mar. 6, 2017  (JP) ............................. JP2017-041994
Mar. 6, 2017  (JP) ............................. JP2017-041995

(51) Int. Cl.
*C08G 18/00*   (2006.01)
*C08G 18/20*   (2006.01)
*C08G 18/32*   (2006.01)
*C08G 18/48*   (2006.01)
*C08G 18/66*   (2006.01)
*C08G 18/76*   (2006.01)
*C08K 5/42*    (2006.01)
*C08L 75/04*   (2006.01)

(52) U.S. Cl.
CPC .............. *C08L 75/04* (2013.01); *C08G 18/00* (2013.01); *C08G 18/76* (2013.01); *C08K 5/42* (2013.01); *C08K 2201/014* (2013.01); *C08L 2203/14* (2013.01)

(58) Field of Classification Search
CPC ................................ C08J 9/0014; C08J 9/033
See application file for complete search history.

(56) References Cited

U.S. PATENT DOCUMENTS

| | | | | |
|---|---|---|---|---|
| 4,124,518 A | * | 11/1978 | Stone ...................... | A47L 13/17 15/104.93 |
| 4,481,309 A | * | 11/1984 | Straehle ............. | C08G 18/4887 521/172 |
| 4,751,251 A | * | 6/1988 | Thornsberry .......... | C08J 9/0061 521/112 |
| 5,472,987 A | | 12/1995 | Reedy et al. | |
| 2008/0171831 A1 | * | 7/2008 | Kashiwazaki ....... | C08G 18/348 524/591 |
| 2009/0253822 A1 | * | 10/2009 | Yano ................... | C08G 18/4845 521/176 |
| 2010/0240786 A1 | * | 9/2010 | Glos ........................ | C08K 9/04 521/170 |
| 2011/0124759 A1 | * | 5/2011 | Birch .................... | C08G 18/482 521/131 |
| 2012/0252926 A1 | * | 10/2012 | Meyer .................... | C08G 18/12 523/122 |
| 2013/0190414 A1 | * | 7/2013 | Terheiden .............. | C08J 9/0028 521/111 |
| 2014/0186611 A1 | * | 7/2014 | Skowronski ............. | C08J 9/146 428/304.4 |
| 2015/0307811 A1 | | 10/2015 | Narine et al. | |
| 2015/0376324 A1 | * | 12/2015 | Bang .................. | C08G 18/7831 521/121 |

(Continued)

FOREIGN PATENT DOCUMENTS

| | | |
|---|---|---|
| CN | 102898678 A | 1/2013 |
| CN | 105051096 A | 11/2015 |
| JP | S53-119904 A | 10/1978 |

(Continued)

OTHER PUBLICATIONS

Machine Translation of JP-2006233054-A obtained from the European Patent Office in Mar. 2022.*
Supplementary European Search Report for European Patent Application No. 17836940.1 dated Apr. 2, 2020, 8 pages.
International Search Report dated Oct. 10, 2017, in International Patent Application No. PCT/JP2017/027815, 2 pages.
International Preliminary Reporton Patentability dated Feb. 14, 2019, in International Patent Application No. PCT/JP2017/027815, 11 pages.

(Continued)

*Primary Examiner* — Melissa A Rioja
(74) *Attorney, Agent, or Firm* — Squire Patton Boggs (US) LLP

(57) ABSTRACT

The present invention provides a polyol composition that can secure the stability over time even when a large amount of water is blended in the polyol composition; a flexible polyurethane foam that uses the polyol composition, is low in density and is excellent in durability; and a method for producing the same. The above objects are solved by a polyol composition for molding a flexible polyurethane foam, comprising a polyol component; a catalyst; a foam stabilizer; a foaming agent; and a compatibilizing agent, wherein the compatibilizing agent is an anionic surfactant which has a hydrophilic portion having an alkali metal salt, and which has a hydrophobic portion having an aromatic ring or alternatively a hydrophobic portion not having an aromatic ring but containing 8 or more carbon atoms in total.

10 Claims, No Drawings

(56) References Cited

U.S. PATENT DOCUMENTS

2016/0200856 A1* 7/2016 Jimenez ............ C08G 18/7671
                                                         521/131
2016/0244582 A1* 8/2016 Ono ..................... C08K 5/5399

FOREIGN PATENT DOCUMENTS

| JP | S55-66918 A | 5/1980 |
| JP | 2953627 B2 | 9/1999 |
| JP | 2000-248032 A | 9/2000 |
| JP | 2004-002788 A | 1/2004 |
| JP | 2005-187788 A | 7/2005 |
| JP | 2006233054 A * | 7/2006 |
| JP | 2010-005241 A | 1/2010 |
| JP | 2012-065744 A | 4/2012 |
| JP | 2015-034233 A | 2/2015 |
| KR | 10-2008-0005936 A | 1/2008 |

OTHER PUBLICATIONS

Application Manual for Surfactant (second edition); Edited by Liu Cheng, Zhang Wan Fu, and Chen Zhang Ming; Published by Chemistry Industry Press (No. 3, Huixin Village, Chaoyang District, Beijing) Distributed by Xinhua Bookstore, Beijing Distributor; Printed by Lianhua Printing Office, Beijing City; Book Bond by Prospect book bindery, Sanhe City, Aug. 1995, second edition, Aerosol; Dioctyl Sulfosuccinate Sodium Salt; Anionic; American Cyanamid (US), pp. 1-9 with English Abstract translation, 10 pages.
College Professional Textbook; Synthetic Leather Chemistry and Technology; Edited by Ma Xing Yuan, Feng Jian Yan, and Zhang Tao Lin; Published by China Light Industry Press Ltd. (No. 6, East Changan Avenue, Beijing, postal code: 100740); Printed by Million Dragon Printing Office Ltd., Sanhe City; Distributed by all Xinhua Bookstores; Nov. 2015, first print for first edition; Chain Extenders and Crosslinking Agents; 5 pages with English Abstract translation.
Chinese Office Action for Chinese Application No. 201780060132. 5, Office Action dated Oct. 26, 2020, 7 pages.

* cited by examiner

POLYOL COMPOSITION FOR MOLDING FLEXIBLE POLYURETHANE FOAM, AND FLEXIBLE POLYURETHANE FOAM

TECHNICAL FIELD

The present invention relates to a polyol composition for molding a flexible polyurethane foam, and to a flexible polyurethane foam using the composition. More specifically, the present invention relates to a low density flexible polyurethane foam formed from a polyol composition which secures stability over time while a large amount of water of a foaming agent is added thereto, and from polyisocyanate; and a method for producing a flexible polyurethane foam.

BACKGROUND ART

Flexible polyurethane foams are widely used in living goods, automotive materials, clothes, sports and leisure goods, medical materials, civil engineering and construction materials, and the like. Among such application fields, particularly in applications for automobile seat such as a seat cushion and a seat back, reduction in density of the flexible polyurethane foam is required, for cost reduction and weight reduction for coping with fuel efficiency regulation.

The flexible polyurethane foam is generally obtained by mixing a polyol component, a catalyst, a foam stabilizer, a foaming agent and a polyisocyanate component, and by reacting the isocyanate group with an active hydrogen group. In the past, there has been a period when chlorofluorocarbon type and organic type forming agents were used as foaming agents, but in recent years, water that reacts with an isocyanate group in polyisocyanate to generate carbonic acid gas has become the mainstream because of environmental concerns. In a flexible polyurethane molded foam in which the foam is obtained by foaming and curing the materials in a mold, such a method is general as to supply two liquids of a polyol composition in which a polyol component, a catalyst and a foam stabilizer are previously mixed with water of a foaming agent, and of a polyisocyanate component, to a foaming apparatus, and to mix and discharge the two liquids into the mold via a mixing head; and it is effective means for responding to a desire of lowering density to increase the amount of the water to be blended in the polyol composition and to increase the amount of the carbonic acid gas to be generated.

The polyisocyanate component is roughly divided into a TDI-based polyisocyanate component which is mainly consisting of tolylene diisocyanate (TDI), and an MDI-based polyisocyanate component which is mainly consisting of a mixture of diphenylmethane diisocyanate (MDI) and polyphenyl polymethylene polyisocyanate (P-MDI). As for the TDI-based polyisocyanate component, a content of a isocyanate group is high and an amount of carbonic acid gas to be generated per unit weight by a reaction with water is large, and accordingly the TDI-based polyisocyanate component can lower the density without increasing the amount of the water to be blended so much; but there are such problems that the TDI of a raw material tends to easily aggravate a working environment of a production site of the flexible polyurethane foam, because the vapor pressure is high and the toxicity is strong, and that the flexible polyurethane foam obtained by TDI which is bifunctional isocyanate is low in durability.

On the other hand, the MDI-based polyisocyanate component has a tendency opposite to that of the TDI-based polyisocyanate component, and is superior to the TDI-based polyisocyanate component in the points of the working environment and the foam durability, but is low in the content of the isocyanate group, and needs to blend a large amount of water in order to lower the density. There has been a problem of aggravating the compatibility between a hydrophobic component mainly containing a polymer polyol and hydrophilic components such as a catalyst, low molecular weight polyol and polyether polyol which contains a large amount of an ethylene oxide unit, by blending a large amount of water in the polyol composition, and lowering the stability over time of the polyol composition. As means for improving the stability over time of the polyol composition, it is proposed in Japanese Unexamined Patent Publication No. 2004-002788 to use a polyether polyol which has oxyethylene units in a specific range and a high primarization ratio of a terminal end. However, in this method, the compatibility between the hydrophilic component and the hydrophobic component is not sufficiently improved for a polyol composition in which such a large amount of water as to exceed 4.0 mass % is blended. Such a problem tends to occur that the polyol composition during storage is decomposed particularly in the summer season in which ambient temperature is high, and the uniformity of foam performance cannot be kept.

CITATION LIST

Patent Literature

Patent Literature 1
Japanese Unexamined Patent Publication No. 2004-002788

SUMMARY OF INVENTION

Technical Problem

The present invention has been designed with respect to the above background art, and is directed at providing a polyol composition that can secure the stability over time even when a large amount of water is blended in the polyol composition, a flexible polyurethane foam that uses the polyol composition, is low in density and is excellent in durability; and a method for producing the same.

Solution to Problem

As a result of having made an extensive investigation, the present inventors have found that the above described problems can be solved by that a polyol composition contains a specific compatibilizing agent, and have accomplished the present invention.

Specifically, the present invention includes the following embodiments.

(1) A polyol composition for molding a flexible polyurethane foam, comprising a polyol component (A); a catalyst (B); a foam stabilizer (C); a foaming agent (D); and a compatibilizing agent (E), wherein the compatibilizing agent (E) is an anionic surfactant having a hydrophilic portion and a hydrophobic portion, and wherein the hydrophilic portion has a salt consisting of an anionic polar group and an alkali metal, and the hydrophobic portion has an aromatic ring, or alternatively the hydrophobic portion does not have an aromatic ring but contains 8 or more carbon atoms in total.

(2) The polyol composition for molding a flexible polyurethane foam according to (1), wherein the alkali metal salt of the hydrophilic portion of the compatibilizing agent (E) is a sodium salt.

(3) The polyol composition for molding a flexible polyurethane foam according to (1) or (2), wherein the compatibilizing agent (E) is an anionic surfactant having a sodium salt of a naphthalenesulfonic acid formalin condensate.

(4) The polyol composition for molding a flexible polyurethane foam according to (1) or (2), wherein the compatibilizing agent (E) is an anionic surfactant having a sodium salt of a dialkyl sulfosuccinate.

(5) The polyol composition for molding a flexible polyurethane foam according to (1) or (2), wherein the compatibilizing agent (E) is an anionic surfactant having a sodium salt of an alkylbenzenesulfonic acid.

(6) The polyol composition for molding a flexible polyurethane foam according to any one of (1) to (5), wherein the compatibilizing agent (E) is contained in an amount of 0.1 to 5 mass % with respect to the polyol component (A).

(7) The polyol composition for molding a flexible polyurethane foam according to any one of (1) to (6), wherein the polyol component (A) comprises at least one cyclic glycol selected from the group consisting of alicyclic glycols and aromatic glycols.

(8) The polyol composition for molding a flexible polyurethane foam according to (7), wherein a content of the at least one cyclic glycol selected from the group consisting of alicyclic glycols and aromatic glycols is 1.5 to 8 mass % with respect to the polyol component (A).

(9) A flexible polyurethane foam comprising: the polyol composition for molding a flexible polyurethane foam according to any one of (1) to (8); and a polyisocyanate component (F).

(10) The flexible polyurethane foam according to (9), wherein the polyisocyanate component (F) contains diphenylmethane diisocyanate in a range of 50 to 85 mass %, and a total amount of 2,2'-diphenylmethane diisocyanate and 2,4'-diphenylmethane diisocyanate contained in the diphenylmethane diisocyanate is 10 to 50 mass % with respect to a total amount of the diphenylmethane diisocyanate.

(11) The flexible polyurethane foam according to (9) or (10), wherein an apparent density is less than 40 kg/m$^3$, and a 25% compression hardness of a foam test piece provided with a skin is 50 to 250 N/314 cm$^2$.

(12) The flexible polyurethane foam according to any one of (9) to (11), wherein a coefficient of hysteresis loss is less than 30%, and a wet heat compression strain is less than 20%.

(13) A method for producing a flexible polyurethane foam, comprising reacting the polyol composition for molding a flexible polyurethane foam according to any one of (1) to (8) with a polyisocyanate component (F).

(14) The method for producing a flexible polyurethane foam according to (13), wherein the polyisocyanate component (F) contains diphenylmethane diisocyanate in a range of 50 to 85 mass %, and a total amount of 2,2'-diphenylmethane diisocyanate and 2,4'-diphenylmethane diisocyanate contained in the diphenylmethane diisocyanate is 10 to 50 mass % with respect to a total amount of the diphenylmethane diisocyanate.

(15) The method for producing a flexible polyurethane foam according to (13) or (14), wherein an apparent density of the flexible polyurethane foam to be obtained is less than 40 kg/m$^3$, and a 25% compression hardness of a foam test piece provided with a skin is 50 to 250 N/314 cm$^2$.

(16) The method for producing a flexible polyurethane foam according to any one of (13) to (15), wherein a coefficient of hysteresis loss of the flexible polyurethane foam to be obtained is less than 30%, and a wet heat compression strain thereof is less than 20%.

Advantageous Effects of Invention

According to the present invention, a flexible polyurethane foam can be obtained which has stability over time of the polyol composition secured and has excellent durability even though the density is low, even in the case where a large amount of water has been blended in the polyol composition, when the flexible polyurethane foam is molded.

DESCRIPTION OF EMBODIMENTS

The present invention will be described in more detail.
The polyol composition for flexible polyurethane foam of the present invention comprises a polyol component (A), a catalyst (B), a foam stabilizer (C), a foaming agent (D) and a compatibilizing agent (E), which are described below.

The polyol component (A) is one which forms polyurethane by causing addition polymerization with diisocyanate, and in the present invention, is preferably at least one selected from the group consisting of polyether polyols and polyester polyols. Furthermore, it is more preferable that a number average molecular weight is 1000 to 10000, and the number of nominal functional groups is 2 or more. When the number average molecular weight is less than the lower limit, a flexibility of a foam to be obtained becomes insufficient, and when exceeding the upper limit, the hardness of the foam tends to decrease. In addition, when the number of the nominal functional groups is less than 2, there arises a problem that a compression residual strain which is an index of durability deteriorates. For information, the number of the nominal functional groups means the number of theoretical average functional groups (number of active hydrogen atoms per molecule), when it is assumed that a side reaction does not occur during the polymerization reaction of polyol.

Examples of the polyether polyol to be used include polypropylene ethylene polyol and polytetramethylene ether glycol (PTG); and examples of the polyester polyol to be used include a polyester polyol that consists of adipic acid and ethylene glycol, which is a polycondensation type polyester-based polyol, and polycaprolactone polyol of a lactone-based polyester polyol.

As the catalyst (B), various urethanated catalysts known in the relevant field can be used, and examples thereof include triethylamine, tripropylamine, tributylamine, N-methylmorpholine, N-ethylmorpholine, dimethylbenzylamine, N,N,N',N'-tetramethylhexamethylenediamine, N,N,N',N',N''-pentamethyldiethylenetriamine, bis-(2-dimethylaminoethyl) ether, triethylenediamine, 1,8-diaza-bicyclo[5.4.0]undecene-7,1,2-dimethylimidazole, dimethylethanolamine and N,N-dimethyl-N-hexanolamine; further organic acid salts thereof; and also organometallic compounds such as stannous octoate and zinc naphthenate. In addition, amine catalysts having active hydrogen such as N,N-dimethylethanolamine and N,N-diethylethanolamine are also preferable.

It is preferable that an amount of the catalyst (B) to be added is 0.01 to 10 mass % with respect to the polyol component (A). If the amount of the catalyst (B) to be added is less than the lower limit value, the curing tends to be insufficient, and if the amount of the catalyst (B) to be added exceeds the upper limit value, it may occur that the moldability deteriorates.

As the foam stabilizer (C), a usual surfactant is used, and an organosilicon-based surfactant can be suitably used. Examples of the foam stabilizer (C) include: SZ-1327, SZ-1325, SZ-1336 and SZ-3601 made by Dow Corning Toray Co., Ltd.; Y-10366 and L-5309 made by Momentive Corporation; and B-8724 LF2 and B-8715 LF2 made by Evonik Japan Co., Ltd.; and F-122 made by Shin-Etsu Chemical Co., Ltd. It is preferable that an amount of these foam stabilizers is 0.1 to 3 mass % with respect to the polyol component (A).

As the foaming agent (D), water is used. Water reacts with an isocyanate group to generate carbonic acid gas, and thereby can form foam. In addition, an arbitrary foaming agent may be used additionally with water. For example, a small amount of an organic compound having a low boiling point such as cyclopentane and isopentane may be concomitantly used; or it is possible to form foam by using a gas loading device and mixing and dissolving air, nitrogen gas or liquefied carbon dioxide into a stock solution. An amount of the foaming agent to be added is usually 0.5 to 10 mass % with respect to the polyol component (A), but when it is intended to obtain a low density flexible polyurethane foam of which an apparent density is less than 40 kg/m$^3$, it is preferable to be 4.0 to 8.0 mass %, and is further preferable to be 5.0 to 8.0 mass %. If the amount of the foaming agent to be added exceeds the upper limit, there is the case where foaming resists being stabilized, and if the amount is less than the lower limit, there is the case where the density of the foam may not be sufficiently lowered. When a large amount of water of 4.0 mass % or more is added, it is possible to secure stability over time of the polyol composition by adding the compatibilizing agent (E) of the present invention.

The compatibilizing agent (E) in the present invention is an anionic surfactant having a hydrophilic portion and a hydrophobic portion. The hydrophilic portion of the compatibilizing agent (E) has a salt (alkali metal salt) consisting of an anionic polar group and an alkali metal; and it is preferable to have an alkali metal salt of sulfonic acid, a carboxylic acid, phosphoric acid or the like, and it is further preferable to have an alkali metal salt of sulfonic acid. Furthermore, it is preferable that the alkali metal salt of the hydrophilic portion is a sodium salt.

In addition, the hydrophobic portion of the compatibilizing agent (E) has an aromatic ring, or alternatively the hydrophobic portion does not have an aromatic ring but contains 8 or more carbon atoms in total. Here, when the hydrophobic portion has an aromatic ring, it is preferable that the anionic polar group of the hydrophilic portion is directly bonded to the aromatic ring, and the aromatic ring may be a polycyclic aromatic hydrocarbon. In addition, in the case where the compatibilizing agent (E) has a hydrophobic portion which does not have an aromatic ring but contains 8 or more carbon atoms in total, the compatibilizing agent (E) may have such a hydrophobic portion that the number of carbon atoms contained, for example, in an alkyl group, an alkylene group, an ester group, a carbonate group or the like in the hydrophobic portion is 8 or more in total, and it is preferable that the total number is 40 or less. Examples of the anionic surfactant having these structures include: an alkali metal salt of a naphthalenesulfonic acid formalin condensate; an alkali metal salt of a dialkyl sulfosuccinate; and an alkali metal salt of an alkylbenzenesulfonic acid.

Examples of the alkali metal salt of the naphthalenesulfonic acid formalin condensate include: a sodium salt of a β-naphthalenesulfonic acid formalin condensate; and a sodium salt of an alkylnaphthalene sulfonic acid formalin condensate. Examples of the alkali metal salt of the dialkyl sulfosuccinate include: di-2-ethylhexyl sulfosuccinate sodium salt and a sodium salt of di-tridecyl sulfosuccinate. Examples of the alkali metal salt of the alkylbenzenesulfonic acid include a sodium salt of dodecylbenzenesulfonic acid.

As for the amount of the compatibilizing agent (E) to be added, it is preferable to contain 0.1 to 5 mass % with respect to the polyol component (A). If the amount is less than the lower limit value, it is difficult to obtain an effect of improving the compatibility, and if the amount exceeds the upper limit value, the moldability of the foam occasionally deteriorates.

By using the above described polyol composition comprising the polyol component (A), the catalyst (B), the foam stabilizer (C), the foaming agent (D) and the compatibilizing agent (E), it is possible to secure adequate compatibility even when a large amount of water has been blended in the polyol composition.

In addition, in the present invention, it is preferable that the polyol component (A) contains at least one cyclic glycol selected from the group consisting of alicyclic glycols and aromatic glycols (hereinafter referred to simply as "cyclic glycol").

The cyclic glycol is a compound having a cyclic structure in the compound, and examples of the cyclic glycol include cyclohexane diol, cyclohexane dimethanol, hydroquinone bis(2-hydroxyethyl) ether, dihydroxydiphenyl methane, a hydride of bisphenol A, polyoxyethylene bisphenol ether and polyoxypropylene bisphenol ether. Among these, 1,4-cyclohexanedimethanol and polyoxyethylene bisphenol A ether are preferable, from the viewpoint that an effect of improving the wet heat compression strain of a flexible polyurethane foam to be obtained is high.

It is preferable for the content of the cyclic glycol to be 1.5 to 8 mass %, and is more preferable to be 1.5 to 6 mass %, with respect to the polyol component (A).

In the present invention, the flexible polyurethane foam can be obtained by mixing the above described polyol composition for molding a flexible polyurethane foam and the polyisocyanate component (F), and forming form.

As for the polyisocyanate component (F), it is preferable to use diphenylmethane diisocyanate (hereinafter referred to as MDI) such as 4,4'-diphenylmethane diisocyanate (hereinafter referred to as 4,4'-MDI), 2,4'-diphenylmethane diisocyanate (hereinafter referred to as 2,4'-MDI) and 2,2'-diphenylmethane diisocyanate (hereinafter referred to as 2,2'-MDI), and polyphenylene polymethylene polyisocyanate (hereinafter referred to as P-MDI), as an isocyanate source. In the present invention, various modified products of the above described MDI, a mixture of MDI and P-MDI, a urethane modified product, a urea modified product, an allophanate modified product, a biuret modified product and the like can also be used.

It is preferable that a rate of MDI content of the polyisocyanate component (F) according to the present invention is in a range of 50 to 85 mass %. If the rate of MDI content exceeds 85 mass %, there is a possibility that the storage stability at low temperature of the polyisocyanate composition to be obtained and the durability of a flexible foam to be obtained are lowered; and on the other hand, if the MDI content is less than 50 mass %, there is a possibility that the elongation of the flexible polyurethane foam decreases and it becomes difficult to obtain a sufficient foam strength, as the crosslink density increases.

Furthermore, it is preferable that the total of a content of 2,2'-MDI and a content of 2,4'-MDI with respect to the total amount of MDI (hereinafter referred to as isomer content) is 10 to 50 mass %.

When the content of 2,2'-MDI and 2,4'-MDI with respect to the total amount of MDI according to the present invention is less than 10 mass %, there is a possibility that the storage stability at low temperature of the obtained polyisocyanate composition is impaired, and there is the case where it becomes necessary to constantly warm an isocyanate storage place, pipes and the inside of the foam molding machine. In addition, the molding stability of the flexible polyurethane foam tends to be easily impaired, and there is the case where foam collapse and the like occur in a middle of forming foam. On the other hand, when the content exceeds 50 mass %, the reactivity is lowered, and there is a possibility that such problems occur that a molding cycle is extended, a closed cell ratio of foam becomes high, and the foam shrinks after having been molded.

In the production of the flexible polyurethane foam of the present invention, it is possible to use various well-known additives or auxiliary agents such as fillers like calcium carbonate and barium sulfate, flame retardants, plasticizers, coloring agents and antifungal agents, as needed.

By use of the polyol composition and the polyisocyanate component as described above in the present invention, it is possible to suitably obtain such a flexible polyurethane foam that an apparent density is less than 40 kg/m$^3$, and that a 25% compression hardness of a foam test piece provided with a skin is 50 to 250 N/314 cm$^2$, a coefficient of hysteresis loss thereof is less than 30%, and a wet heat compression strain thereof is less than 20%.

In addition, by the polyol component (A) containing the above described cyclic glycol, the wet heat compression strain is further improved, and the value can be controlled to less than 15%.

Next, a method for producing the flexible polyurethane foam of the present invention will be described.

The flexible polyurethane foam of the present invention can be produced by making a mixture of a polyol component (A), a catalyst (B), a foam stabilizer (C), a foaming agent (D), a compatibilizing agent (E) and a polyisocyanate component (F) react and forming foam.

It is preferable for a molar ratio (NCO/active hydrogen) of the total isocyanate groups to all the active hydrogen groups in chemical compounds containing active hydrogen groups, which include water, in the polyisocyanate composition of the present invention, at the time of mixing and foaming, to be 0.7 to 1.4 (isocyanate index (NCO INDEX)=70 to 140), and as for an adequate range for the durability and molding cycle of the foam, it is more preferably to be 0.7 to 1.2 (NCO INDEX=70 to 120).

When the NCO INDEX is less than 70, the durability lowers and a closed cell property excessively rises; and when the NCO INDEX is higher than 120, there is the case where the molding cycle is extended due to unreacted isocyanate which has remained for a long period of time, and cell collapse occurs in a middle of forming foam due to the delay of change to high molecular weight.

As for a method for producing the flexible polyurethane foam, it is possible to use a method for producing a flexible polyurethane molded foam (hereinafter referred to as flexible mold foam) of: injecting a foaming stock solution of a mixed liquid of the above described polyol component (A), the catalyst (B), the foam stabilizer (C), the foaming agent (D), the compatibilizing agent (E), and the polyisocyanate component (F) into a mold; and then forming foam and curing the foaming stock solution.

A mold temperature at the time when the above described foaming stock solution is injected into the mold is usually 30 to 80° C., and preferably is 45 to 65° C. If the mold temperature at the time when the above described foaming stock solution is injected into the mold is lower than 30° C., the temperature leads to an extension of the production cycle due to lowering of the reaction rate: and on the other hand, if the temperature is higher than 80° C., the reaction between water and isocyanate is excessively promoted, in the reaction of the polyol and the isocyanate, and there is the case where the foam thereby collapses in a middle of forming foam.

The curing time at the time when the above described foaming stock solution is foamed and cured is preferably 10 minutes or shorter, and is more preferably 7 minutes or shorter, in consideration of a production cycle of a general flexible mold foam.

When the flexible mold foam is produced, each of the above described components can be mixed by using a high-pressure foaming machine, a low-pressure foaming machine or the like, similarly to the case of an ordinary flexible mold foam.

It is preferable to mix the isocyanate component and the polyol component just before forming foam. It is possible to premix the other components with the isocyanate component or the polyol component within such a range as not to affect the storage stability of the raw material or the change over time in reactivity. Those mixtures may be used immediately after mixing, or after storage, a necessary amount may be used appropriately. In the case of a foaming apparatus into a mixing section of which more than two components can be simultaneously introduced, it is also possible to individually introduce the polyol, the foaming agent, the isocyanate, the catalyst, the foam stabilizer, the additive and the like, into the mixing section.

In addition, a mixing method may be any of dynamic mixing of performing mixing in mixing chamber in a machine head of a foaming machine, and static mixing of performing mixing in a liquid feeding pipe; or may concomitantly use both. There are many cases where mixing of a gaseous component such as a physical foaming agent with a liquid component is performed by the static mixing, and mixing of components that can be stably stored as a liquid is performed by dynamic mixing. It is preferable that the foaming apparatus to be used in the present invention is a high pressure foaming apparatus which does not need to wash the mixing section with a solvent.

The mixed solution obtained by such mixing is discharged into a metal mold (mold), is foamed and cured, and then is demolded. It is also preferable to previously apply a release agent to the metal mold, so as to smoothly perform the above described demolding. As for the releasing agent to be used, it is acceptable to use a releasing agent which is usually used in a molding and manufacturing field.

The demolded product can be used as it is, but it is preferable to destroy a cell membrane of the foam under compression or under reduced pressure by a conventionally known method, and to stabilize an appearance and dimension of a subsequent product.

By the method for producing the flexible polyurethane foam of the present invention, such a flexible polyurethane foam can be obtained that the apparent density is less than 40 kg/m$^3$, the 25% compression hardness of the foam test piece provided with the skin is 50 to 250 N/314 cm$^2$, the coefficient of hysteresis loss is less than 30%, and the wet heat compression strain is less than 20%.

In addition, by the polyol component (A) containing the above described cyclic glycol, the wet heat compression strain is further improved, and the value can be controlled to less than 15%.

EXAMPLE

The present invention will be described more specifically in detail based on Examples and Comparative Examples, but the present invention is not limited to the following Examples. Incidentally, unless otherwise specified, "parts" and "%" in the text are based on mass.

[Preparation of Polyol Composition]

Examples 1 to 10, and Comparative Examples 1 to 7

A reactor equipped with a stirrer, a cooling tube, a nitrogen inlet tube and a thermometer was purged with nitrogen, and then 100 g of polyol 1, 3 g of polyol 3, 1 g of a compatibilizing agent 1, 0.16 g of a catalyst 1, 0.72 g of a catalyst 2, 1 g of a foam stabilizer 1 and 5.4 g of water were charged into the reactor; the mixture was stirred at 23° C. for 0.5 hours; and a polyol composition (P-1) was obtained. Other polyol compositions (P-2 to P-17) were also prepared similarly to P-1. The results are shown in Table 1 and Table 2.

TABLE 1

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Name of polyol composition | P-1 | P-2 | P-3 | P-4 | P-5 | P-6 | P-7 | P-8 | P-9 | P-10 |
| Polyol 1 | 100 | 100 | 100 | 100 | 100 | 100 | 100 | 100 | 100 | 100 |
| Polyol 2 |  |  |  |  |  |  |  |  |  |  |
| Polyol 3 | 3 | 3 | 3 | 3 | 3 | 3 | 3 | 3 | 3 | 3 |
| Glycol 1 |  |  |  |  |  |  |  | 8 | 4 |  |
| Glycol 2 |  |  |  |  |  |  |  |  | 4 | 1.5 |
| Compatibilizing agent 1 | 1 | 0.5 | 4.5 |  |  |  | 1 | 1 | 1 | 1 |
| Compatibilizing agent 2 |  |  |  | 1 |  |  |  |  |  |  |
| Compatibilizing agent 3 |  |  |  |  | 1 |  |  |  |  |  |
| Compatibilizing agent 4 |  |  |  |  |  | 1 |  |  |  |  |
| Compatibilizing agent 5 |  |  |  |  |  |  |  |  |  |  |
| Compatibilizing agent 6 |  |  |  |  |  |  |  |  |  |  |
| Compatibilizing agent 7 |  |  |  |  |  |  |  |  |  |  |
| Compatibilizing agent 8 |  |  |  |  |  |  |  |  |  |  |
| Compatibilizing agent 9 |  |  |  |  |  |  |  |  |  |  |
| Catalyst 1 | 0.16 | 0.16 | 0.16 | 0.16 | 0.16 | 0.16 | 0.16 | 0.16 | 0.16 | 0.16 |
| Catalyst 2 | 0.72 | 0.72 | 0.72 | 0.72 | 0.72 | 0.72 | 0.72 | 0.72 | 0.72 | 0.72 |
| Foam stabilizer | 1 | 1 | 1 | 1 | 1 | 1 | 1 | 1 | 1 | 1 |
| Water | 5.4 | 5.7 | 3.4 | 5.2 | 5.4 | 5.4 | 5.4 | 5.4 | 5.4 | 5.4 |
| Storage stability of polyol composition (25° C., 30 days) | ○ | ○ | ○ | ○ | ○ | ○ | ○ | ○ | ○ | ○ |

TABLE 2

|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Name of polyol composition | P-11 | P-12 | P-13 | P-14 | P-15 | P-16 | P-17 |
| Polyol 1 | 100 | 100 | 100 | 100 | 100 | 100 | 100 |
| Polyol 2 |  | 15 |  |  |  |  |  |
| Polyol 3 | 3 | 3 | 3 | 3 | 3 | 3 | 3 |
| Glycol 1 |  |  |  |  |  |  |  |
| Glycol 2 |  |  |  |  |  |  |  |
| Compatibilizing agent 1 |  |  |  |  |  |  |  |
| Compatibilizing agent 2 |  |  |  |  |  |  |  |
| Compatibilizing agent 3 |  |  |  |  |  |  |  |
| Compatibilizing agent 4 |  |  |  |  |  |  |  |
| Compatibilizing agent 5 |  |  |  | 1 |  |  |  |
| Compatibilizing agent 6 |  |  |  |  | 1 |  |  |
| Compatibilizing agent 7 |  |  |  |  |  | 1 |  |
| Compatibilizing agent 8 |  |  |  |  |  |  | 1 |
| Compatibilizing agent 9 |  |  |  |  |  |  | 1 |
| Catalyst 1 | 0.16 | 0.16 | 0.16 | 0.16 | 0.16 | 0.16 | 0.16 |
| Catalyst 2 | 0.72 | 0.72 | 0.72 | 0.72 | 0.72 | 0.72 | 0.72 |
| Foam stabilizer | 1 | 1 | 1 | 1 | 1 | 1 | 1 |
| Water | 5.4 | 5.4 | 5.4 | 5.4 | 5.4 | 5.4 | 5.4 |
| Storage stability of polyol composition (25° C., 30 days) | X | X | X | X | X | X | X |

Examples 11 to 20

A liquid temperature of a mixture (polyol composition) of all the raw materials except for a polyisocyanate compound among raw materials shown in Table 3 was adjusted to 24° C. to 26° C., and a polyisocyanate component was adjusted at a liquid temperature of 24° C. to 26° C. A predetermined amount of the polyisocyanate component was added to the polyol composition, the mixture was mixed by a mixer (7000 revolutions per minute) for 7 seconds, the mixed substance was injected into a mold, the flexible polyurethane foam was foamed, then the foam was taken out from the mold, and the obtained flexible polyurethane foam was subjected to measurement of physical properties. For information, NCO Index in Table 3 is a ratio of NCO groups to the number of active hydrogen atoms existing in the blend.

[Foaming Condition]
Mold temperature: 60 to 65° C.
Mold shape: 400 mm×400 mm×100 mm
Mold material: aluminum
Curing condition: 60 to 65° C.×5 minutes

[Raw Materials Used]
Polyol 1: Polyoxyethylene polyoxypropylene polyol that is EL851 made by Asahi Glass Urethane Co., Ltd., in which an average number of functional groups=3.0, and a hydroxyl value=24 (mgKOH/g).
Polyol 2: polyoxyethylene polyoxypropylene polyol that is NEF-693 made by Tosoh Corporation, in which the average number of functional groups=3.0, and the hydroxyl value=24 (mgKOH/g), in which a primarization ratio of terminal ends=84%, and an oxyethylene unit=14.6%.
Polyol 3: polyoxyethylene polyoxypropylene polyol that is NEF-024 made by Tosoh Corporation, in which the average number of functional groups=4.0, and the hydroxyl value=28 (mgKOH/g).
Glycol 1: CHDM-D (1,4-cyclohexanedimethanol, made by Eastman Chemical Company), alicyclic glycol
Glycol 2: NEWPOL BPE-60 (polyoxyethylene bisphenol A ether, made by Sanyo Chemical Industries, Ltd.), aromatic glycol
Compatibilizing agent 1: Demol NL (sodium salt of β-naphthalenesulfonic acid formalin condensate, made

TABLE 3

| | Example 11 | Example 12 | Example 13 | Example 14 | Example 15 | Example 16 | Example 17 | Example 18 | Example 19 | Example 20 |
|---|---|---|---|---|---|---|---|---|---|---|
| P-1 | 100 | | | | | | | | | |
| P-2 | | 100 | | | | | | | | |
| P-3 | | | 100 | | | | | | | |
| P-4 | | | | 100 | | | | | | |
| P-5 | | | | | 100 | | | | | |
| P-6 | | | | | | 100 | | | | |
| P-7 | | | | | | | 100 | | | |
| P-8 | | | | | | | | 100 | | |
| P-9 | | | | | | | | | 100 | |
| P-10 | | | | | | | | | | 100 |
| Isocyanate 1 | 72.0 | 72.2 | 71.8 | 71.9 | 72.0 | 72.0 | 77.7 | 74.9 | 71.1 | 71.6 |
| NCO Index | 85 | 85 | 85 | 85 | 85 | 85 | 85 | 85 | 85 | 85 |
| Apparent density (kg/m$^3$) | 35 | 35 | 35 | 35 | 35 | 35 | 35 | 35 | 35 | 35 |
| 25% ILD (N/314 cm$^2$) | 110 | 108 | 111 | 109 | 110 | 109 | 114 | 113 | 113 | 111 |
| Moldability | ○ | ○ | ○ | ○ | ○ | ○ | ○ | ○ | ○ | ○ |
| Coefficient of hysteresis loss (%) | 28 | 27 | 28 | 28 | 27 | 28 | 28 | 27 | 27 | 28 |
| Wet heat compression strain (%) | 17 | 18 | 18 | 17 | 17 | 18 | 14 | 12 | 13 | 14 |

TABLE 4

| | Example 11 | Reference Example 1 | Reference Example 2 | Reference Example 3 | Reference Example 4 | Reference Example 5 |
|---|---|---|---|---|---|---|
| P-1 | 100 | 100 | 100 | 100 | 100 | 100 |
| Isocyanate 1 | 72.0 | | | | | |
| Isocyanate 2 | | 47.3 | | | | |
| Isocyanate 3 | | | 72.0 | | | |
| Isocyanate 4 | | | | 72.0 | | |
| Isocyanate 5 | | | | | 72.0 | |
| Isocyanate 6 | | | | | | 72.0 |
| NCO Index | 85 | 85 | 85 | 85 | 85 | 85 |
| Density (kg/m$^3$) | 35 | 35 | | | | |
| 25% ILD (N/314 cm$^2$) | 110 | 80 | | | | |
| Moldability | ○ | ○ | X (Shrinkage) | X (Collapse) | X (Collapse) | X (Shrinkage) |
| Coefficient of hysteresis loss (%) | 28 | 26 | | | | |
| Wet heat compression strain (%) | 17 | 28 | | | | | by Kao Corporation), anionic surfactant; aqueous solution of which a solid content is 41%

Compatibilizing agent 2: Neoperex G-15 (sodium salt of dodecylbenzenesulfonic acid, made by Kao Corporation), anionic surfactant Compatibilizing agent 3: Newcol N-291 PG (sodium salt of di-2-ethylhexyl sulfosuccinate, made by Nippon Nyukazai Co., Ltd.), anionic surfactant Compatibilizing agent 4: Perex TR (sodium salt of dialkyl sulfosuccinate having 13 carbon atoms, made by Kao Corporation), anionic surfactant Compatibilizing agent 5: Newcol 1008 (polyoxyethylene 2-ethylhexyl ether, made by Nippon Nyukazai Co., Ltd.), alkyl ether type surfactant Compatibilizeing agent 6: Newcol 1305 (polyoxyethylene tridecyl ether, made by Nippon Nyukazai Co., Ltd.), alkyl ether type surfactant Compatibilizing agent 7: PERSOFT EF-T (polyoxyethylene-alkyl ether-sulfuric acid ester triethanol salt, made by NOF Corporation), anionic surfactant Compatibilizing agent 8: LATEMUL PD-104 (polyoxyalkylene alkenyl ether ammonium sulfate, made by Kao Corporation), anionic surfactant Compatibilizing agent 9: Emulgen 102 KG (polyoxyethylene alkyl ether, made by Kao Corporation), nonionic surfactant Catalyst 1: 33% dipropylene glycol solution of triethylenediamine, TEDA-L33 made by Tosoh Corporation Catalyst 2: 1,2-dimethyl imidazole, TOYOCAT-DMI made by Tosoh Corporation Foam stabilizer: silicone-based foam stabilizer, Y-10366 made by Momentive Corporation Isocyanate 1: Polyphenylene polymethylene polyisocyanate of which a rate of MDI content is 75 mass % and of which a rate of isomer content is 38 mass % (CEF-536, made by Tosoh Corporation)

Isocyanate 2: toluene diisocyanate-based polyisocyanate (CORONATE T-80, made by Tosoh Corporation)

Isocyanate 3: Polyphenylene polymethylene polyisocyanate of which the rate of MDI content is 48 mass % and of which the rate of isomer content is 18 mass % (CEF-531, made by Tosoh Corporation)

Isocyanate 4: Polyphenylene polymethylene polyisocyanate of which the rate of MDI content is 95 mass % and of which the rate of isomer content is 18 mass % (CEF-532, made by Tosoh Corporation)

Isocyanate 5: Polyphenylene polymethylene polyisocyanate of which the rate of MDI content is 70 mass % and of which the rate of isomer content is 5 mass % (CEF-533, made by Tosoh Corporation)

Isocyanate 6: Polyphenylene polymethylene polyisocyanate of which the rate of MDI content is 70 mass % and of which the rate of isomer content is 60 mass % (CEF-534, made by Tosoh Corporation)

[Evaluation of Moldability]

In the table, the evaluation of moldability "O" means that the flexible polyurethane foam can be molded without causing such a collapse that the urethane foam reaches a maximum height and then greatly sinks, or such a phenomenon that the formed urethane foam shrinks immediately after having been foamed or after having been cured.

[Apparent Density]

An apparent density was determined according to the method described in JIS K 6400.

[25% Compression Hardness (25% ILD) of Foam Test Piece Provided with Skin]

The compression hardness was determined according to Method B described in JIS K 6400.

[Coefficient of Hysteresis Loss]

The coefficient of hysteresis loss was measured according to Method B described in JIS K 6400.

[Wet Heat Compression Strain]

The compression strain was measured according to the method described in JIS K 6400.

[Stability Over Time of Polyol Composition]

A prepared polyol composition was charged into a sealed container of 200 ml and was left at rest at 25° C. for 30 days, and then the presence or absence of separation was visually checked.

As shown in Comparative Example 1 in Table 2, when the compatibilizing agent 1 is not used, compatibility cannot be sufficiently improved, and separation results in occurring within 30 days. In addition, as shown in Comparative Example 2, even though a polyether polyol has been used which has a specific range of oxyethylene units and a specific amount of a primarization ratio of terminal ends, the improvement of the compatibility between the hydrophilic component and the hydrophobic component in the polyol composition blended with a large amount of water is insufficient, and the polyol composition results in being separated within 30 days. In addition, as shown in Comparative Examples 3 to 7, even when a nonionic surfactant has been used as a compatibilizing agent and an anionic surfactant which does not have an alkali metal salt in the hydrophilic portion have been used, the stability over times of the polyol composition is poor, and the separation results in occurring within 30 days.

As shown in Examples 11 to 20 in Table 3, when flexible polyurethane foams have been produced by use of the polyol compositions of Examples 1 to 10, it is possible to obtain a molded body of which the apparent density is less than 40 kg/m$^3$, of which the 25% compression hardness of a foam test piece provided with a skin is 50 to 250 N/314 cm$^2$, of which the coefficient of hysteresis loss is less than 30%, and of which the wet heat compression strain is less than 20%.

Incidentally, as for the polyol compositions shown in Comparative Examples 1 to 7, the flexible polyurethane foam is not produced, because the polyol compositions do not satisfy the stability over time.

In addition, as shown in Reference Example 1 of Table 4, it is understood that when the toluene diisocyanate-based polyisocyanate is used as the isocyanate component, there is the case where the value of wet heat compression strain results in deteriorating. In addition, as shown in Reference Examples 2 to 5, it is understood that a flexible polyurethane foam having adequate moldability is not obtained, depending on the rate of MDI content and the rate of isomer content of the polyphenylene polymethylene polyisocyanate.

The flexible polyurethane foam obtained by the present invention is extremely useful for achieving both the performance and the weight reduction of a flexible foam for a seat cushion and a seat back for automobiles.

According to the comparison between the above described examples and comparative examples, in the present invention, it is possible to secure the compatibility between the hydrophobic component which is mainly the polymer polyol and the hydrophilic component, and to thereby suppress separation, even though a large amount of water has been mixed in the polyol composition. In addition, it is clear that a molded body is obtained which has a low density and satisfies preferable physical property values in the flexible polyurethane foam that uses the polyol composition, and it is possible to understand the significance and remarkable excellence of the constitution of the present invention.

Although the present invention has been described in detail and with reference to specific embodiments, it is apparent to those skilled in the art that various changes and modifications can be made without departing from the essence and scope of the present invention.

The entire contents of the specifications, claims and abstracts of Japanese Patent Application No. 2016-154423 filed on Aug. 5, in 2016, Japanese Patent Application No. 2016-208836 filed on Oct. 25, in 2016, Japanese Patent Application No. 2017-041994 filed on Mar. 6, in 2017 and Japanese Patent Application No. 2017-041995 filed on Mar. 6, in 2017 are cited herein, and are incorporated as the disclosure of the specification of the present invention.

The invention claimed is:

1. A flexible polyurethane foam, prepared from a polyol composition comprising:
   a polyol component (A);
   a catalyst (B);
   a foam stabilizer (C);
   a foaming agent (D);
   a compatibilizing agent (E), wherein the compatibilizing agent (E) is a sodium salt of a naphthalenesulfonic acid formalin condensate, and wherein the compatibilizing agent (E) is contained in an amount of 0.1 to 5 mass % with respect to the polyol component (A); and
   a polyisocyanate component (F), wherein the polyisocyanate component (F) contains diphenylmethane diisocyanate in a range of 50 to 85 mass %, and a total amount of 2,2'-diphenylmethane diisocyanate and 2,4'-diphenylmethane diisocyanate contained in the diphenylmethane diisocyanate is 10 to 50 mass % with respect to a total amount of the diphenylmethane diisocyanate.

2. The flexible polyurethane foam according to claim 1, wherein the polyol component (A) comprises at least one cyclic glycol selected from the group consisting of alicyclic glycols and aromatic glycols.

3. The flexible polyurethane foam according to claim 2, wherein a content of the at least one cyclic glycol selected from the group consisting of alicyclic glycols and aromatic glycols is 1.5 to 8 mass % with respect to the polyol component (A).

4. The flexible polyurethane foam according to claim 1, wherein the polyisocyanate component (F) contains diphenylmethane diisocyanate with a rate of 75 mass %, and a total amount of 2,2'-diphenylmethane diisocyanate and 2,4'-diphenylmethane diisocyanate contained in the diphenylmethane diisocyanate is 38 mass % with respect to a total amount of the diphenylmethane diisocyanate.

5. The flexible polyurethane foam according to claim 1, wherein an apparent density is less than 40 kg/m$^3$, and a 25% compression hardness of a foam test piece provided with a skin is 50 to 250 N/314 cm$^2$.

6. The flexible polyurethane foam according to claim 1, wherein a coefficient of hysteresis loss is less than 30%, and a wet heat compression strain is less than 20%.

7. A method for producing a flexible polyurethane foam, comprising reacting a polyol composition comprising:
   a polyol component (A);
   a catalyst (B);
   a foam stabilizer (C);
   a foaming agent (D); and
   a compatibilizing agent (E), wherein the compatibilizing agent (E) is a sodium salt of a naphthalenesulfonic acid formalin condensate, and wherein the compatibilizing agent (E) is contained in an amount of 0.1 to 5 mass % with respect to the polyol component (A);
   with a polyisocyanate component (F),
   wherein the polyisocyanate component (F) contains diphenylmethane diisocyanate in a range of 50 to 85 mass %, and a total amount of 2,2'-diphenylmethane diisocyanate and 2,4'-diphenylmethane diisocyanate contained in the diphenylmethane diisocyanate is 10 to 50 mass % with respect to a total amount of the diphenylmethane diisocyanate.

8. The method for producing a flexible polyurethane foam according to claim 7, wherein the polyisocyanate component (F) contains diphenylmethane diisocyanate with a rate of 75 mass %, and a total amount of 2,2'-diphenylmethane diisocyanate and 2,4'-diphenylmethane diisocyanate contained in the diphenylmethane diisocyanate is 38 mass % with respect to a total amount of the diphenylmethane diisocyanate.

9. The method for producing a flexible polyurethane foam according to claim 7, wherein an apparent density of the flexible polyurethane foam to be obtained is less than 40 kg/m$^3$, and a 25% compression hardness of a foam test piece provided with a skin is 50 to 250 N/314 cm$^2$.

10. The method for producing a flexible polyurethane foam according to claim 7, wherein a coefficient of hysteresis loss of the flexible polyurethane foam to be obtained is less than 30%, and a wet heat compression strain thereof is less than 20%.

* * * * *